United States Patent [19]

Weiser et al.

[11] Patent Number: 5,322,915

[45] Date of Patent: Jun. 21, 1994

[54] MODIFIED MELAMINE-FORMALDEHYDE RESINS

[75] Inventors: Juergen Weiser, Schriesheim; Wolfgang Reuther, Heidelberg; Rolf Fikentscher, Ludwigshafen; Wolfgang Fath, Hirschberg; Heinz Berbner, Moerlenbach; Hans D. Zettler, Gruenstadt; Heinz Voelker, Limburgerhof, all of Fed. Rep. of Germany

[73] Assignee: BASF Aktiengesellschaft, Ludwigshafen, Fed. Rep. of Germany

[21] Appl. No.: 910,382

[22] Filed: Jul. 8, 1992

[30] Foreign Application Priority Data

Jul. 12, 1991 [DE] Fed. Rep. of Germany ....... 4123050

[51] Int. Cl.$^5$ .............................................. C08G 14/10
[52] U.S. Cl. .................................... 528/163; 528/129; 528/230; 528/252; 528/254
[58] Field of Search ................ 528/129, 163, 230, 252, 528/254

[56] References Cited

U.S. PATENT DOCUMENTS

| | | | |
|---|---|---|---|
| 3,093,600 | 6/1963 | Spencer et al. | 521/187 |
| 3,734,918 | 5/1973 | Mayer et al. | 524/841 |
| 4,088,620 | 5/1978 | Nihongi et al. | 524/503 |
| 4,165,413 | 8/1979 | Sefton et al. | 521/128 |
| 4,334,971 | 6/1982 | Mahnke et al. | 204/159.21 |
| 4,424,261 | 1/1984 | Keeling et al. | 428/530 |
| 4,511,678 | 4/1985 | Mahnke et al. | 521/52 |
| 4,540,717 | 9/1985 | Mahnke et al. | 521/52 |
| 4,591,613 | 5/1986 | Karam et al. | 524/597 |
| 4,996,289 | 2/1991 | Berbner et al. | 528/230 |
| 5,084,488 | 1/1992 | Weiser et al. | 521/187 |

FOREIGN PATENT DOCUMENTS

| | | |
|---|---|---|
| 221330 | 9/1986 | European Pat. Off. |
| 355760 | 8/1989 | European Pat. Off. |
| 408947 | 6/1990 | European Pat. Off. |
| 2020481 | 4/1970 | Fed. Rep. of Germany |
| 2364091 | 7/1976 | Fed. Rep. of Germany |
| 2915457 | 10/1980 | Fed. Rep. of Germany |
| 2203746 | 10/1988 | United Kingdom |

OTHER PUBLICATIONS

File Supplier PAJ/JPO (Abstract of JP-A 56049716, May 6, 1981).

Primary Examiner—Samuel A. Acquah
Attorney, Agent, or Firm—Keil & Weinkauf

[57] ABSTRACT

A condensation polymer, obtainable by condensation of a mixture containing, as chief components,
(A) from 90 to 99.9% molar of a mixture substantially consisting of
  (a) from 30 to 99% molar of melamine and
  (b) from 1 to 70% molar of a substituted melamine of the general formula I

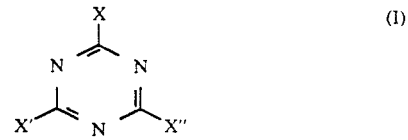

in which X, X′, and X″ are selected from the group consisting of —NH$_2$, —NHR, and —NRR′, and only one or two of X, X′, and X″ denote(s) —NH$_2$, and R and R′ are selected from the group consisting of hydroxy-C$_2$-C$_{10}$-alkyl, hydroxy-C$_2$-C$_4$-alkyl-(oxa-C$_2$-C$_4$-alkyl)$_n$, where n is an integer from 1 to 5, and amino-C$_2$-C$_{12}$-alkyl, or mixtures of melamines I, and (B) from 0.1 to 10% molar, based on (A) and (B), of unsubstituted phenols or phenols substituted by radicals selected from the group consisting of C$_1$-C$_9$-alkyl and hydroxy, or of C$_1$-C$_4$-alkanes substituted by two or three phenol groups, di(hydroxyphenyl)sulfones, or mixtures of said phenols, with formaldehyde or formaldehyde-liberating compounds, the molar ratio of melamine to formaldehyde ranging from 1:1.15 to 1:4.5.

5 Claims, No Drawings

MODIFIED MELAMINE-FORMALDEHYDE RESINS

The invention relates to condensation polymers which may be obtained by condensation of a mixture containing, as chief components, (A) from 90 to 99.9% molar of a mixture substantially consisting of
  (a) from 30 to 99% molar of melamine and
  (b) from 1 to 70% molar of a substituted melamine of the general formula I

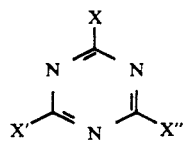

in which X, X', and X" are selected from the group consisting of —$NH_2$, —NHR, and —NRR', and only one or two of X, X", and X" denote(s) —$NH_2$, and R and R' are selected from the group consisting of hydroxy-$C_2$–$C_{10}$-alkyl, hydroxy-$C_2$–$C_4$-alkyl-(oxa-$C_2$–$C_4$-alkyl)$_n$, where n is an integer from 1 to 5, and amino-$C_2$–$C_{12}$-alkyl, or mixtures of melamines I, and (B) from 0.1 to 10% molar, based on (A) and (B), of unsubstituted phenols or phenols substituted by radicals selected from the group consisting of $C_1$–$C_9$-alkyl and hydroxy, or of $C_1$–$C_4$-alkanes substituted by two or three phenol groups, di(hydroxyphenyl)sulfones, or mixtures of said phenols, with formaldehyde or formaldehyde-liberating compounds, the molar ratio of melamine to formaldehyde ranging from 1:1.15 to 1:4.5.

The invention further relates to a process for the preparation of said condensation polymers, to their use in the manufacture of fibers and foams, and to molded articles made from said condensation polymers.

DE-PS 2,020,481 describes an aminoplastic wood glue composed of melamine or a mixture of melamine and urea, formaldehyde, and from 5 to 20% molar of a phenol.

Further disclosures are made in DE-A 2,915,457, DE-A 2,364,091, EP-A 221,330, and EP-A 408,947 relating to molded articles such as foams and fibers of poly(melamine-co-formaldehyde)s, in which the melamine is wholly or partially replaced by substituted melamines such as hydroxyalkyl-substituted or hydroxyalkyl-oxaalkyl-substituted melamines.

A drawback of the prior melamine-formaldehyde resins is their inadequate resistance to hydrolysis combined with excessive emission of formaldehyde.

It is thus an object of the present invention to provide poly(melamine-co-formaldehyde)s which do not suffer from the above drawbacks when cured.

Accordingly, we have found the condensation polymers defined above.

We have also found a process for the preparation of said condensation polymers, a method of using them for the preparation of fibers and foams, and molded articles made from said polymers.

The melamine resins of the invention contain, as constituent monomer (A), from 90 to 99.9% molar of a mixture substantially comprising from 30 to 99% molar and preferably from 50 to 99% molar and more preferably from 85 to 95% molar of melamine and from 1 to 70% molar and preferably from 1 to 50% molar and more preferably from 5 to 15% molar of a substituted melamine I or a mixture of melamines I.

Our melamine resins also contain, as further constituent monomer (B), from 0.1 to 10% molar, based on the total moles of monomers (A) and (B), of a phenol or mixture of phenols.

The condensation polymers of the invention can be prepared by the reaction of components (A) and (B) with formaldehyde or formaldehyde-liberating compounds, the molar ratio of melamine to formaldehyde ranging from 1:1.15 to 1:1.45 and preferably from 1:1.8 to 1:3.0.

Suitable substituted melamines of the general formula I

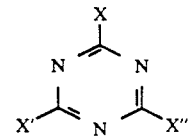

are those in which X, X', and X" are selected from the group consisting of —$NH_2$, —NHR, and —NRR', and only one or two of X, X', and X" denote(s) —$NH_2$, and R and R' are selected from the group consisting of hydroxy-$C_2$–$C_{10}$-alkyl, hydroxy-$C_2$–$C_4$-alkyl-(oxa-$C_2$–$C_4$-alkyl)$_n$, where n is an integer from 1 to 5, and amino-$C_2$–$C_{12}$-alkyl.

The hydroxy-$C_2$–$C_{10}$-alkyl groups are preferably hydroxy-$C_2$–$C_6$-alkyl groups such as 2-hydroxyethyl, 3-hydroxy-n-propyl, 2-hydroxyisopropyl, 4-hydroxy-n-butyl, 5-hydroxy-n-pentyl, 6-hydroxy-n-hexyl, and 3-hydroxy-2,2-dimethylpropyl, and more preferably hydroxy-$C_2$–$C_4$-alkyl groups such as 2-hydroxyethyl, 3-hydroxy-n-propyl, 2-hydroxyisopropyl, and 4-hydroxy-n-butyl, and most preferably 2-hydroxyethyl and 2-hydroxyisopropyl.

The hydroxy-$C_2$–$C_4$-alkyl-(oxa-$C_2$–$C_4$-alkyl)$_n$ groups are preferably those in which n is an integer from 1 to 4 and more preferably those in which n is equal to 1 or 2, such as 5-hydroxy-3-oxapentyl, 5-hydroxy-3-oxa-2,5-dimethylpentyl, 5-hydroxy-3-oxa-1,4-dimethylpentyl, 5-hydroxy-3-oxa-1,2,4,5-tetramethylpentyl, and 8-hydroxy-3,6-dioxaoctyl.

The amino-$C_2$–$C_{12}$-alkyl groups are preferably amino-$C_2$–$C_8$-alkyl groups such as 2-aminoethyl, 3-aminopropyl, 4-aminobutyl, 5-aminopentyl, 6-aminohexyl, 7-aminoheptyl, and 8-aminooctyl, and more preferably 2-aminoethyl and 6-aminohexyl, and most preferably 6-aminohexyl.

Particularly suitable substituted melamines for use in the present invention are the following compounds: 2-hydroxyethylamino-1,3,5-triazines such as 2-hydroxyethylamino-1,3,5-triazine, 2,4-di(2-hydroxyethylamino)-1,3,5-triazine, 2,4,6-tris(2-hydroxyethylamino)-1,3,5-triazine, 2-hydroxyisopropylamino-1,3,5-triazines such as 2-(2-hydroxyisopropylamino)-1,3,5-triazine, 2,4-di(2-hydroxyisopropylamino)-1,3,5-triazine, 2,4,6-tris(2-hydroxyisopropylamino)-1,3,5-triazine, 5-hydroxy-3-oxapentylamino-1,3,5-triazines such as 2-(5-hydroxy-3-oxapentylamino)-1,3,5-triazine, 2,4-di(5-hydroxy-3-oxapentylamino)-1,3,5-triazine, 2,4,6-tris(5-hydroxy-3-oxapentylamino)-1,3,5-triazine, and 6-aminohexylamino-1,3,5-triazines such as 2-(6-aminohexylamino)-1,3,5-triazine, 2,4-di(6-aminohexylamino)-1,3,5-triazine, 2,4,6-tris(6-aminohexylamino)-1,3,5-triazine, or mixtures thereof, for example a mixture of 10% molar of 2-(5-hydroxy-3-oxapentylamino)-1,3,5-triazine, 50% molar of 2,4-di(5-hydroxy-3-oxapentylamino)-1,3,5-triazine, and 40% molar of 2,4,6-tris(5-hydroxy-3-oxapentylamino)-1,3,5-triazine.

Suitable phenols (B) are phenols which contain one or two hydroxy groups, such as unsubstituted phenol or phenols substituted by radicals selected from the group comprising $C_1$–$C_9$-alkyl and hydroxy, $C_1$–$C_4$-alkanes which are substituted by two or three phenol groups, and also di(hydroxyphenyl)-sulfones, or mixtures of said phenols.

The preferred phenols are: phenol, 4-methyl phenol, 4-tert-butyl phenol, 4-n-octyl phenol, 4-n-nonyl phenol, catechol, resorcinol, hydroquinone, 2,2-bis(4-hydroxyphenyl)propane, 4,4'-dihydroxydiphenylsulfone, and the more preferred compounds are phenol, resorcinol, and 2,2-bis(4-hydroxyphenyl)propane.

Formaldehyde is usually used in the form of an aqueous solution having a concentration of, say, from 40 to 50% w/w, or in the form of a compound which liberates formaldehyde during the reaction with (A) and (B), for example an oligomeric or polymeric formaldehyde as solid substance, e.g., paraformaldehyde, 1,3,5-trioxane, and 1,3,5,7-tetroxocane.

For the production of fibers it is advantageous to use from 1 to 50% molar and preferably from 5 to 15% molar and more preferably from 7 to 12% molar of the substituted melamine and from 0.1 to 9.5% molar and preferably from 1 to 5% molar of the aforementioned phenols or mixtures.

For the production of foams it is advantageous to use from 0.5 to 20% molar and preferably from 1 to 10% molar and more preferably from 1.5 to 5% molar of the substituted melamine or mixtures of substituted melamines and from 0.1 to 5% molar and preferably from 1 to 3% molar of the aforementioned phenols or mixtures.

The resins are manufactured by polycondensing melamine, substituted melamine, and phenol together with formaldehyde or a formaldehyde-liberating compound. The reaction can be started with a mixture of all of the necessary components or, alternatively, the components may be brought together portionwise and successively for conversion to precondensates, to which further amounts of melamine, substituted melamine or phenol can be added.

The polycondensation is normally carried out in known manner (cf EP-A 355,760, Houben-Weyl, Vol 14/2, pp 357 et seq).

The reaction is generally carried out at temperatures ranging from 20° to 150° C. and preferably from 40° to 140° C.

The pressure at which the reaction is carried out is not usually critical, but the pressure used is generally between 100 and 500 kPa and is preferably from 100 to 300 kPa.

The reaction can be carried out with or without the use of a solvent. When an aqueous formaldehyde solution is used, it will not be usual to add any further solvent. When the formaldehyde is bound in a solid substance, it will be usual to use water as solvent, the quantity used being normally in the range of from 5% to 40% w/w and preferably from 15% to 24% w/w, based on the total weight of monomers used.

The polycondensation is generally carried out at a pH greater than 7, the preferred range being from 7.5 to 10.0 and in particular from 8 to 10.

In addition, small amounts of conventional additives may be added to the reaction mixture, for example alkali metal sulfites, e.g., sodium disulfite and sodium sulfite, alkali metal formates, e.g., sodium formate, alkali metal citrates, e.g., sodium citrate, phosphates, polyphosphates, urea, dicyandiamide, and cyanamide. Such additives may be added individually or in the form of additive mixtures, either in substance or in the form of aqueous solutions, prior to, during, or after the condensation reaction.

Other modifiers are amines and aminoalcohols such as diethylamine, ethanolamine, diethanolamine, and 2-diethylaminoethanol.

Other additives that can be used include fillers, emulsifiers, and expanding agents.

Examples of suitable fillers are fibrous or powdered inorganic reinforcing agents or fillers, for example glass fibers, metal powders, metal salts, or silicates such as kaolin, talcum, heavy spar, quartz, or chalk, and also pigments and dyes. The emulsifiers used are usually the conventional nonionogenic, anionic, or cationic organic compounds containing long-chain alkyl radicals. When the uncured resins are to be converted to foams, the expanding agent used may be, e.g., pentane.

The polycondensation can be carried out batchwise or continuously in, say, an extruder (cf EP-A 355,760), by conventional methods.

Molded articles are made by curing the condensation polymers of the invention in conventional manner by adding small amounts of acids such as formic acid, sulfuric acid, or ammonium chloride.

Foams can be prepared by expanding an aqueous solution or dispersion which contains the uncured condensation polymer, an emulsifier, an expanding agent, a curing agent, and possibly other conventional additives as described above, and then curing the resulting foam. Such a method is described in detail in DE-A 2,915,457.

Fibers are usually made by spinning the melamine resin of the invention in known manner in a rotospin machine at room temperature, for example after a curing agent has been added, followed by curing of the resulting fibers in a heated atmosphere; or by spinning the resin in a heated atmosphere to evaporate off the water serving as solvent, after which curing of the spun resin is carried to completion. Such a procedure is described in detail in DE-A 2,364,091.

The condensation polymers of the invention, and particularly the foams and fibers obtained therefrom, are characterized by an improved resistance to hydrolysis and a reduced tendency to emit formaldehyde, as compared with the prior art. The fibers of the invention may be employed as such or in admixture with, say, other natural or synthetic fibers. They may be used for making non-woven, woven or knitted fabrics suitable for use in the manufacture of, say, fire-proof clothing.

Examples

After each condensation reaction, there was added to the resulting resinous compound of the invention 2% w/w (based on the total weight) of 35% strength formic acid acting as curing agent. The resulting blend was forced through a rotospin machine having a spineret diameter of 500 $\mu$m, at 30° C. The crude fibers thus obtained were then heated at 230° C. for 1.5 h. The resulting fibers had a diameter of from 5 to 50 $\mu$m and a length of from 1 to 200 cm.

The viscosities given in the examples were determined using a cone/plate viscosimeter (Epprecht Instruments+Controls, gauge "D" cone) at a rate of shear of 20s⁻¹ and at a temperature of 20° C.

The formaldehyde emission was measured using the test method No. 112—1978 of the American Association of Textile Chemists and Colorists (AATCC).

In this test, a carefully weighed amount (ca 1 g) of the product was placed in a glass frit within a closed vessel containing 50 ml of water such that the test sample did not come into direct contact with the water. The test vessels were then heated at a temperature of 49°±1° C. for 20 h. They were then allowed to cool to room temperature over approximately 90 min, after which the samples were removed from the vessels, which were then shaken. From each of the resulting test solutions there was then taken 1 ml, to which 10 ml of an aqueous reagent solution containing 1.5 g of ammonium acetate, 0.03 ml of gacial acetic acid, and 0.02 ml of acetylacetone were added, and the whole was heated in a water bath at 58° C. for 7 min. The solutions obtained had a yellow coloration of an intensity varying with the formaldehyde content and whose absorbance values were measured after cooling (ca 30 min) in a spectrophotometer at 412 nm.

Zero calibration was previously carried out using a blank sample (10 ml of reagent solution plus 1 ml of distilled water).

The formaldehyde content was determined by comparing the absorbance values thus obtained with the absorbance values of standard solutions containing a known amount of formaldehyde, the latter values having been determined by the same method and then plotted to form a calibration curve.

The resistance to hydrolysis was tested by refluxing a mixture of about 3 g of fibers in 1 l of water for 24 h. The fibers were then dried to constant weight at 90° C. in a drying cabinet.

EXAMPLE 1

(a) Melamine resin containing no phenol (Comparative Example)

1,262.8 g (10.01 moles) of melamine, 456.5 g of an 80% strength aqueous solution of an isomer mixture comprising 10% molar of 5-hydroxy-3-oxapentylamino-1,3,5-triazine, 50% molar of di(5-hydroxy-3-oxapentylamino)-1,3,5-triazine, and 40% molar of tris(5-hydroxy-3-oxapentylamino)-1,3,5-triazine (HOM) (1.11 moles), 86.6 g of dicyanamide, and 70.0 g of sodium disulfite were mixed with 553.1 g of paraformaldehyde, 5.0 g of 2-diethylaminoethanol, and 896.3 g of a 40% strength aqueous formaldehyde solution, and the resulting mixture was continuously condensed in an extruder (Werner & Pfleiderer, ZHS 130) at a temperature of 120° C. to obtain a viscosity of 500 Pa.s. The values found for formaldehyde emission and loss of weight were as follows:

formaldehyde emission 2.500 ppm
weight loss due to hydrolysis 60% w/w (b) Melamine resin containing 5.0% w/w of phenol 1,286.5 g (10.20 moles) of melamine, 486 g of an 80% strength aqueous solution of HOM (1.18 moles), 93.8 g of dicyandiamide, 75.3 g of sodium disulfite, and 56.5 g (0.60 mole) of phenol were mixed with 600.4 g of paraformaldehyde, 5.3 g of 2-diethylaminoethanol, and 967.2 g of a 40%-strength aqueous formaldehyde solution. The reaction mixture was then refluxed until its viscosity was 500 Pa.s. The values obtained for formaldehyde emission and loss of weight were as follows:

formaldehyde emission 1.700 ppm
weight loss due to hydrolysis 30% w/w

EXAMPLE 2

(a) Melamine resin containing no phenol (Comparative Test)

1,362.2 g (10.81 moles) of melamine, 486.0 g of an 80% strength aqueous solution of HOM (1.18 moles), 93.8 g of dicyandiamide, and 37.7 g of sodium disulfite were mixed with 603.4 g of paraformaldehyde, 5.3 g of 2-diethylaminoethanol, and 956.0 g of a 40% strength aqueous formaldehyde solution. The reaction mixture was then refluxed until its viscosity was 500 Pa.s. The values obtained for formaldehyde emission and loss of weight were as follows:

formaldehyde emission 2.380 ppm
weight loss due to hydrolysis 56% w/w (b) Melamine resin containing 10% molar of phenol 1,292.8 g (10.26 moles) of melamine, 407.4 g of an 80% strength aqueous solution of HOM (0.99 mole), 98.0 g of dicyandiamide, 35.8 g of sodium disulfite, and 107.3 g (1.14 moles) of phenol were mixed with 554.5 g of paraformaldehyde, 5.0 g of 2-diethylaminoethanol, and 956.5 g of a 40%-strength aqueous formaldehyde solution. The reaction mixture was then refluxed until its viscosity was 500 Pa.s. The values obtained for formaldehyde emission and loss of weight were as follows:

formaldehyde emission 1.160 ppm
weight loss due to hydrolysis 28% w/w

EXAMPLE 3

(a) Melamine resin containing no phenol (Comparative Test)

1,769 g (14.03 moles) of melamine and 618 g of an 80% strength aqueous solution of HOM (1.50 moles) were mixed with 557.7 g of paraformaldehyde, 6.9 g of 2-diethylaminoethanol, and 1,063 g of a 40% strength aqueous formaldehyde solution. The reaction mixture was then refluxed until its viscosity was 500 Pa.s. The values obtained for formaldehyde emission and loss of weight were as follows:

formaldehyde emission 675 ppm
weight loss due to hydrolysis 14% w/w (b) Melamine resin containing 3% molar of phenol 1,791.7 g (14.22 moles) of melamine, 626.1 g of an 80% strength aqueous solution of HOM (1.52 moles), and 44.6 g (0.47 mole) of phenol were mixed with 557.9 g of paraformaldehyde, 7.0 g of 2-diethylaminoethanol, and 1,093.9 g of a 40% strength aqueous formaldehyde solution. The reaction mixture was then refluxed until its viscosity was 500 Pa.s. The values obtained for formaldehyde emission and loss of weight were as follows:

formaldehyde emission 430 ppm
weight loss due to hydrolysis 10% w/w

We claim:

1. A condensation polymer, obtained by condensation of a mixture containing,
   (A) from 90 to 99.9% molar of a mixture consisting essentially of
      (a) from 30 to 99% molar of melamine and
      (b) from 1 to 70% molar of a substituted melamine of the formula I

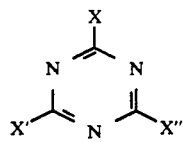

in which x, x', and x" are selected from the group consisting of —NH$_2$, —NHR, and —NRR', and only one or two of x, x', and x" denote(s) —NH$_2$, and R and R' are selected from the group consisting of hydroxy-C$_2$-C$_{10}$-alkyl, hydroxy-C$_2$-C$_4$-alkyl-(oxa-C$_2$-C$_4$-alkyl)$_n$, where n is an integer from 1 to 5, and amino-C$_2$-C$_{12}$-alkyl, or mixtures of melamines I, and (B) from 0.1 to 10% molar, based on (A) and (B), of unsubstituted phenols or phenols substituted by radicals selected from the group consisting of C$_1$-C$_9$-alkyl and hydroxy, or of C$_1$-C$_4$-alkanes substituted by two or three phenol groups, di(hydroxyphenyl)sulfones, or mixtures of said phenols, with formaldehyde or formaldehyde-liberating compounds, the molar ratio of melamine to formaldehyde ranging from 1:1.15 to 1:4.5.

2. A condensation polymer as defined in claim 1, wherein the phenol used is one selected from the group consisting of phenol, 2,2-bis(4-hydroxyphenol)propane, and resorcinol.

3. A process for the preparation of a condensation polymer as defined in claim 1, wherein the components (A) and (B) are condensed with formaldehyde or formaldehyde-liberating compounds at a temperature of from 20° to 150° C. and a pressure of from 100 to 500 kPa.

4. The process of claim 3, wherein the condensation is carried out in an aqueous solution.

5. A condensation polymer of claim 1, wherein at least one X, X', or X" is a radical of the group consisting of 2-hydroxyethylamino; 2-hydroxyisopropylamino; 5-hydroxy-3-oxapentylamino; and 6-amino-hexylamino.

* * * * *